United States Patent [19]

Hara

[11] Patent Number: 4,889,738

[45] Date of Patent: Dec. 26, 1989

[54] AEROCHOCOLATES AND PROCESS FOR PREPARING THE SAME

[75] Inventor: Jun Hara, Tokyo, Japan

[73] Assignee: Morinaga & Co., Ltd., Tokyo, Japan

[21] Appl. No.: 275,613

[22] Filed: Nov. 25, 1988

Related U.S. Application Data

[63] Continuation of Ser. No. 943,408, Dec. 19, 1986, abandoned.

[30] Foreign Application Priority Data

Dec. 20, 1985 [JP] Japan .................................. 60-287222
Aug. 26, 1986 [JP] Japan .................................. 61-199607

[51] Int. Cl.$^4$ ............................................... A23G 1/00
[52] U.S. Cl. .................................... 426/572; 426/564;
426/631; 426/660
[58] Field of Search ................ 426/564, 660, 572, 631

[56] References Cited

U.S. PATENT DOCUMENTS 3,542,270 11/1970 Schubiger et al. .................. 426/572
4,120,987 10/1978 Moore ................................. 426/660
4,410,552 10/1983 Gaffney et al. ..................... 426/572

Primary Examiner—Barry S. Richman
Assistant Examiner—Lyle Alfandary-Alexander
Attorney, Agent, or Firm—Armstrong, Nikaido, Marmelstein, Kubovcik & Murray

[57] ABSTRACT

Aerochocolates in which the gas forms the continous phase and the solid chocolate forms a fine granular conglomerate and a process for manufacturing aerochocolates having the apparent desity of between 0.23 and 0.48, whose chocolate is in the state of a fine granular conglomerate, which process comprises agitating, with cooling, a melted chocolate so as to include gas therein until its temperature becomes 8° to 14° C. lower than the melting point of the fat contained in the chocolate and until its apparent density becomes between 1.1 and 0.7, and expanding it under reduced pressure of 150 Torr or lower, whereby converting the gas and the solid phases.

2 Claims, 1 Drawing Sheet

AEROCHOCOLATES AND PROCESS FOR PREPARING THE SAME

This application is a continuation of application Ser. No. 943,408 filed Dec. 19, 1986 abandoned.

BACKGROUND OF THE INVENTION

1. Field of the Invention

The present invention relates to aerochocolates having a novel texture and a process for preparing the same.

2. Description of the Prior Art

Normally, chocolates should avoid containing gas, typically air. Contrary to the normal chocolates, aerochocolates contain gas in order to impart to them mild, light and creamy touch when they are eaten. The prior art aerochocolates have such a texture that the chocolate forms the continuous phase in which gas forms the discontinuous phase in the form of numbers of gas bubbles, as shown in FIG. 2. Such prior art aerochocolates are manufactured by filling a tempered chocolate in a mould, then by cooling it, under reduced pressure whereby expanding the gas spontaneously contained in the chocolate during processing, and finally by solidifying the chocolate. Alternatively, they are manufactured by agitating a tempered chocolate whereby allowing gas bubbles to be incorporated into the chocolate, then by cooling and solidifying the chocolate in a mould. The agitation may be effected while applying pressure.

As mentioned above, the texture of the prior art aerochocolates is such that numbers of gas bubbles which form the discontinuous phase are dispersed in the chocolate which forms the continuous phase. Because of this, the chocolate is required beyond certain amount as opposed to relatively small amount of gas present in the aerochocolates. Such chocolate forms partitions by which gas is surrounded and shut out, and the aerochocolates having such a structure fail to give a light, mild and creamy touch to the mouth sufficiently.

The gas content in the aerochocolates may not be increased, as the gas escapes from the chocolate. Attempts were made to increase the gas content by cooling the chocolate, whereby increasing its viscosity.

However, such attempts turned out to be unsuccessful, as the thickness of the partitions of the aerochocolates so prepared is quite uneven and as the chocolate and gas form continuous and discontinuous phases respectively; such aerochocolates do not give a desired good touch in the mouth.

The inventor of the present application has investigated aerochocolates having a high gas content and having such a light touch in the mouth as fresh cream. As the results, it was found that the gas phase and the chocolate phase are converted by agitating the chocolate with cooling and then by expanding the chocolate under specified conditions of temperature, pressure, apparent density and the like and that the aerochocolates prepared by solidifying the thus obtained chocolate give a light touch in the mouth as exhibited by fresh cream.

SUMMARY OF THE INVENTION

It is therefore an object of the invention to provide aerochocolates comprising the chocolate and gas, in which the gas forms the continuous phase and the chocolate forms almost discontinuous phase in the form of a fine granular conglomerate. Such aerochocolates should preferably have the apparent density of between 0.23 and 0.48.

It is another object of the invention to provide a process for manufacturing aerochocolates whose apparent density is between 0.23 and 0.48 and whose chocolate is in the form of a fine granular conglomerate. The method is characterized by agitating a melted chocolate, with cooling, to a temperature that is from 8° to 14° C. lower than the melting point of the fat contained in the chocolate until the apparent density of the chocolate reaches a range between 1.1 and 0.7 with the inclusion of gas, and then by allowing the chocolate to keep under reduced pressure of 150 Torr or lower, whereby expanding it and converting the solid and the gas phases so that the gas phase becomes the continuous phase.

In this specification, the term "chocolate" includes not only cocoa butter-based products such as chocolate, white chocolate and colored chocolate, but also chocolate-like fat based confectionary coating such as semi-chocolate containing fats other than cocoa butter.

DETAILED DESCRIPTION AND THE PREFERRED EMBODIMENTS OF THE INVENTION

Figure 1:
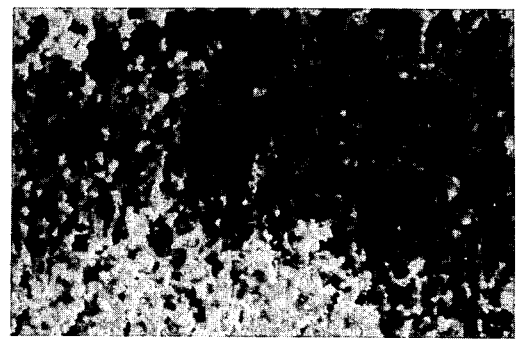
FIG. 1 is a microscopic photograph ($\times 30$), showing the enlarged sectional view of the aerochocolate obtained by Example 1 which will be described hereafter.

In order to obtain aerochocolates with the chocolate described above, the chocolate is melted at a temperature higher than the melting point of the fat contained in the chocolate, which is then agitated, with cooling, while allowing the gas to be contained in it. The purpose of the agitation is to allow the gas to be contained in the chocolate. The gas bubbles should be as fine as possible, so that agitation should be effected as vigorously as possible. The inclusion of gas may be carried out, if necessary, applying pressure. The agitation may be performed, for example, with a beater or OVA-mixer, with the spontaneous intake of the gas. It may also be performed with a batch or continuous aeration device that enables intake of gas, agitation and mixing, such as marshmallow beater, ice cream freezer or Oaks-mixer.

Normally, air is used as the gas. However, other gases such as nitrogen or carbon dioxide which do not accelerate oxidation of fat may also be used.

It is necessary that the agitation is carried out with cooling. The cooling should be continued until the temperature of the chocolate reaches from 8° to 14° C. lower than the melting point of the fat contained in the chocolate. The gas content in the chocolate, the apparent density of which being around 1.25, should be increased until the apparent density of the chocolate containing the gas is in a range of about 1.1 to 0.7.

During cooling of the chocolate, it does not solidify immediately at a melting point of the fat contained in it but keeps fluid state for a certain length of time. Namely, only a part of the fat solidifies upon cooling to make fine crystals, resulting in increase of the viscosity of the chocolate.

Under this condition, the gas tends to be easily included in the chocolate. Excessive cooling results in the loss of fluidity of the chocolate due to excessively increased viscosity and causes the chocolate at times to begin solidifying during the processing, whereby no desired properties of the aerochocolates may be achieved.

When the total amount of the gas contained in the chocolate is too small and the apparent density of the chocolate is larger than 1.1, the gas in the aerochocolates is present in the form of numbers of bubbles, as in the prior art aerochocolates, and does not form the continuous phase.

On the other hand, when the total amount of the gas contained in the chocolate is too much and the apparent density of the chocolate is smaller than 0.7, the phase conversion tends to occur during the following step under reduced pressure with the formation of bit bubbles before the chocolate begins to solidify, resulting in the bursting of the bubbles and degasification. Even if such bursting of the bubbles and degasification do not take place, there emerge big cavities in the chocolate or, as the case may be, separation of the chocolate and the gas phases takes place and, as the result, the fine granular chocolate does not form a single conglomerate. Obviously, these defects greatly damage the commercial value of the products.

In the next step, the chocolate, which still maintains the fluidity, is placed in a mould, vessel or the like and subjected to expansion under reduced pressure which is 150 Torr or lower.

It is important that, upon expansion under reduced pressure, the chocolate should begin to solidify when the apparent density of the chocolate reaches between 0.23 and 0.48. In order to achieve this, it is necessary to adjust the temperature of the chocolate, just after the stirring with cooling, at from 8° to 14° C. lower than the melting point of the fat contained in it. For the same purpose, the ambient temperature under reduced pressure should be adjusted appropriately.

The phase conversion takes place if the expansion and the solidification are performed under the conditions mentioned above. As shown in FIG. 1, which is an enlarged sectional view, the chocolate in the continuous phase becomes a fine granular conglomerate, whereas the gas in the discontinuous phase now forms the continuous phase.

Where the apparent density of the aerochocolate is larger than 0.48, no phase conversion takes place and the gas is present discontinuously in the form of bubbles, as in the prior art aerochocolates. Where the apparent density of the aerochocolate is smaller than 0.23, there tend to emerge big cavities in the aerochocolate or the aerochocolate is too fragile to maintain the shape.

Where the temperature of the chocolate itself is higher than the temperature mentioned above, the solidification of the chocolate proceeds slowly, during which a part of bubbles contained in it escape and, as the result, the phase conversion does not take place.

Where the pressure is reduced above 150 Torr, the phase conversion will not occur and the aerochocolates of the prior art in which the gas forms the discontinuous phase will be obtained.

EXAMPLE 1

A milk chocolate containing cocoa butter and milk fat having a melting point of 33° C. as the fat was placed in a metallic vessel of a OVA-mixer. The chocolate was agitated to introduce air into it, while cooling the vessel with cooled water. The stirring was continued for about 6 minutes when the apparent density of the chocolate became 0.98 and the temperature thereof reached 25.0° C. The chocolate was then placed in a mould while it maintained the fluidity and the mould was placed in a vacuum chamber kept at 8 Torr in order to allow the chocolate to expand. The ambient temperature under reduced pressure was 5.5° C. The chocolate was then solidified, after the expansion, when its apparent density was 0.43. There was thus obtained an aerochocolate whose air formed the continuous phase and whose chocolate formed almost discontinuous phase which was of fine granular conglomerate. The aerochocolate had a light and creamy touch in the mouth and was very delicious. FIG. 1 is a microscopic photograph which shows the sectional view enlarged by 30 times of the aerochocolate obtained in Example 1.

EXAMPLE 2

A chocolate containing cocoa butter only as the fat was placed in an ice cream freezer. Stirring was continued with cooling for 3 minutes blowing into it carbon dioxide gas. At the end of this period, the chocolate contained numbers of fine bubbles. The apparent density of the chocolate was 1.01 and its temperature was 24.5° C. The chocolate was then filled in the wefer shell of "monaka", a bean-jam filled wafer, and then it was expanded at 5 Torr and at 15° C. in a vacuum chamber. It was then solidified when the apparent density of the chocolate became 0.38. The aerochocolate thus produced had a texture similar to that obtained in Example 1 in which the gas formed the continuous phase, and it tasted light and creamy.

EXAMPLE 3

A chocolate tempered by a conventional method was filled in a mould and the excess chocolate was taken away by dripping. The chocolate was cooled and solidified into a chocolate shell, in which another chocolate prepared in Example 2 was filled. The whole chocolate was allowed to stand in a vacuum chamber at 7 Torr and at 18° C. to complete expansion. The chocolate was then cooled when its apparent density became 0.40 to give an aerochocolate. The aerochocolate thus manufactured had substantially the same texture as that of the aerochocolate prepared in Example 1 in which the gas formed the continuous phase. The aerochocolate had a light and mild touch in the mouth, similar to a chocolate containing fresh cream.

EXAMPLE 4

A melted chocolate containing cocoa butter as the fat was fed into a continuous cooling aeration device composed of a cylinder fitted with an air intake and an agitating equipment and capable of being cooled from outside.

The cooling and aeration were controlled so that the chocolate from the outlet had the apparent density of 1.05 and reached the temperature of 25.0° C.

The chocolate so treated and flown continuously out of the device was charged to a mould by means of a depositor. The mould was then kept in a vacuum chamber and allowed to stand at 7 Torr and at 15° C. to complete expansion. The chocolate was then solidified when its apparent density was 0.39. The aerochocolate had a texture substantially the same with that of the aerochocolate obtained in Example 1 in which the gas formed the containuous phase. The aerochocolate had a light touch and melted in the mouth quickly. It tasted creamy and was very delicious.

EXAMPLE 5

A melted chocolate containing cocoa butter as the fat was fed into the continuous cooling aeration device described in Example 4. The cooling and aeration were effected so that the chocolate flown out of the outlet had the apparent density of 0.75 and temperature of 25.0° C. The chocolate continuously flown was charged to a mould by means of a depositor. The mould was kept in a vacuum chamber maintained at 38 Torr and at 15° C. to complete expansion. The chocolate was then solidified when its apparent density was 0.42. The aerochocolate thus produced had a texture substantially the same as that of the aerochocolate obtained in Example 1 in which the gas formed the continuous phase. The aerochocolate had a light touch and melted in the mouth quickly. It tasted creamy and was very delicious.

EXAMPLE 6

A chocolate containing cocoa butter only as the fat was fed in an ice cream freezer and stirred and cooled, while blowing into it nitrogen gas, until it had the apparent density of 0.73 and reached the temperature of 25.5° C. At this stage, the chocolate contained numbers of fine bubbles. The chocolate was then sandwiched with two pieces of biscuits and allowed to stand in a vacuum chamber kept at 25 Torr and at 15° C. to complete expansion. The aerochocolate thus prepared and sandwitched with the biscuits had the apparent density of 0.46. It had the texture substantially the same with that of the aerochocolate obtained in Example 1 in which the gas formed the continuous phase. The aerochocolate had a light touch in the mouth and was creamy.

EXAMPLE 7

A milk chocolate containing the fat having a melting point of 33° C. was fed in an ice cream freezer. The chocolate was vigorously agitated for 3 minutes, with cooling and aeration, to give a chocolate containing numbers of fine bubbles and having the apparent density of 0.78 and the temperature of 25.5° C. The chocolate was then filled in a chocolate shell that had been prepared by the method described in Example 3. The chocolate was then allowed to stand in a vacuum chamber kept at 46 Torr and at 20° C. to complete expansion, after which it was solidified at −20° C. The aerochocolate thus produced had the apparent density of 0.38. The gas phase formed the continuous phase, while the chocolate phase formed a fine granular conglomerate. It had a mild and creamy touch in the mouth and tasted delicious, as compared with a prior art aerochocolate.

COMPARATIVE EXAMPLE

Figure 2:
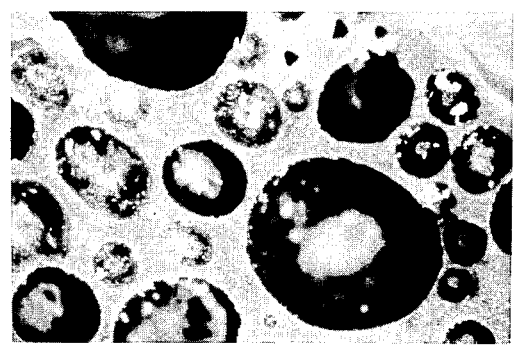
FIG. 2 is a microscopic photograph ($\times 30$), showing the enlarged sectional view of the aerochocolate of the prior art.

A chocolate containing cocoa butter only as the fat was fed into the cooling device described in Example 4, and then the cooling and aeration were effected so that the apparent density of the chocolate became 1.08 and its temperature reached 30° C. The chocolate was placed in a vacuum chamber kept at 30 Torr and at 20° C. to complete the expansion and then solidified at −20° C. to give an aerochocolate. It had the apparent density of 0.80. The conversion of the phases was not observed with the aerochocolate. As shown in FIG. 2, it had such a texture that the chocolate formed the continuous phase in which the gas was dispersed discontinuously.

The aerochocolates according to this invention have the apparent density of between 0.23 and 0.48. The state of the gas and the chocolate which forms the continuous phase and the discontinuous phase, respectively, is totally different from that of the prior art aerochocolates. The gas forms the continuous phase and the solid phase is a conglomerate that consists of a fine granular chocolate.

Thus, the aerochocolates according to this invention in which the gas forms the continuous phase and the chocolate forms almost discontinuous phase give a very light touch and taste delicious just like fresh cream, in comparison with the prior art aerochocolates.

This is considered not only due to the fact that the aerochocolates of this invention have a smaller apparent density and a larger proportion occupied by the gas as compared with the prior art aerochocolates, and hence, the amount of the chocolate eaten each time is smaller than that of the prior art aerochocolates, but also due to the fact that they melt easily in the mouth by virtue of the phase conversion.

The aerochocolates according to this invention have further advantages that they get solid without tempering and do not cause blooming, possibly because the gas is introduced by stirring with cooling.

What is claimed is:

1. An aerochocolate which is a solid chocolate comprising numerous pores forming a continuous phase cavity structure, the aerochocolate having an apparent density of between 0.23 and 0.48 g/cm$^3$, the aerochocolate formed by a process comprising the steps of agitating, while cooling, a melted chocolate until its temperature becomes from 8° to 14° C. lower than the melting point of the fat contained in the chocolate and until its apparent density becomes between 0.7 and 1.1 g/cm$^3$, introducing into the chocolate a gas, followed by expansion of the gas under a reduced pressure of 150 Torr or lower, so that the discontinuous gas phase changes into a continuous gas phase, and a chocolate having an apparent density of between 0.23 and 0.48 g/cm$^3$, is produced.

2. A process for manufacturing aerochocolate having an apparent density of between 0.23 and 0.48 g/cm$^3$ and whose chocolate is a solid chocolate comprising numerous pores forming a continuous phase cavity structure, which processes comprises the steps of agitating, while cooling, a melted chocolate until its temperature becomes from 8° to 14° C. lower than the melting point of the fat contained in the chocolate and until its apparent density becomes between 0.7 and 1.1 g/cm$^3$, introducing into the chocolate a gas, followed by expansion of the gas under a reduced pressure of 150 Torr or lower, so that the discontinuous gas phase changes into a continuous gas phase, and a chocolate having an apparent density of between 0.23 and 0.48 g/cm$^3$, is produced.

* * * * *